(12) United States Patent
Ford et al.

(10) Patent No.: US 6,228,914 B1
(45) Date of Patent: May 8, 2001

(54) INTUMESCENT COMPOSITION AND METHOD

(75) Inventors: Brian M. Ford, Grayslake, IL (US); David A. Hutchings, Tucker, GA (US); Mel E. Foucht, Stone Mountain, GA (US); Shahid P. Qureshi, Duluth, GA (US); Chad E. Garvey, Ball Ground, GA (US); Daniel W. Krassowski, Columbia Township, OH (US)

(73) Assignees: Graftech Inc., Lakewood, OH (US); Georgia-Pacific Resins Inc., Atlanta, GA (US)

( * ) Notice: Subject to any disclaimer, the term of this patent is extended or adjusted under 35 U.S.C. 154(b) by 0 days.

(21) Appl. No.: 09/002,347

(22) Filed: Jan. 2, 1998

(51) Int. Cl.[7] ............... C08K 5/53; B32B 9/04; C09K 21/00
(52) U.S. Cl. ............ 524/124; 524/424; 428/704; 252/609
(58) Field of Search .................. 524/124, 429; 428/704; 252/609

(56) References Cited

U.S. PATENT DOCUMENTS

| | | |
|---|---|---|
| Re. 32,812 | 12/1988 | Lemon et al. . |
| 2,599,807 | 6/1952 | Bersworth . |
| 2,609,390 | 9/1952 | Bersworth . |
| 3,404,061 | 10/1968 | Shane et al. . |
| 3,440,201 | 4/1969 | Sempert et al. . |
| 3,470,112 | 9/1969 | Irani et al. . |
| 3,562,197 | 2/1971 | Sears et al. . |
| 3,574,644 | 4/1971 | Olstowski et al . |
| 3,932,303 | 1/1976 | Hollinghad . |
| 3,983,098 | 9/1976 | Bussi et al. . |
| 4,198,328 | 4/1980 | Bertelli et al. . |
| 4,221,837 | 9/1980 | Nicholson et al. . |
| 4,226,907 | 10/1980 | Sienkowski et al. . |
| 4,234,638 | 11/1980 | Yamazoe et al. . |
| 4,246,157 | 1/1981 | Laitar . |
| 4,331,583 | 5/1982 | Everett . |
| 4,338,209 | 7/1982 | Manabe et al. . |
| 4,370,442 | 1/1983 | Pearson . |
| 4,404,297 | 9/1983 | Fishler et al. . |
| 4,442,157 | 4/1984 | Marx et al. . |
| 4,505,748 | 3/1985 | Baxter . |
| 4,599,369 | 7/1986 | Malcolm-Brown . |
| 4,636,538 | 1/1987 | Malcolm-Brown . |
| 4,638,538 | 1/1987 | Johama et al. . |
| 4,661,280 | 4/1987 | Ouhadi et al. . |
| 4,662,173 | 5/1987 | Broze et al. . |
| 4,671,934 | 6/1987 | Terry et al. . |
| 4,751,320 | 6/1988 | Masuda et al. . |
| 4,786,431 | 11/1988 | Broze et al. . |
| 4,857,364 | 8/1989 | von Bonin . |
| 4,927,550 | 5/1990 | Cutcher et al. . |
| 4,965,296 | 10/1990 | Hastings . |
| 4,983,654 | 1/1991 | Cheung et al. . |
| 4,994,581 | 2/1991 | Takeda et al. . |
| 5,002,126 | 3/1991 | Carlberg et al. . |
| 5,003,036 | 3/1991 | Crompton et al . |
| 5,057,238 | 10/1991 | Broze et al. . |
| 5,094,780 | 3/1992 | von Bonin . |
| 5,152,177 | 10/1992 | Buck et al. . |
| 5,173,515 | 12/1992 | von Bonin et al. . |
| 5,176,863 | 1/1993 | Howard . |
| 5,182,049 | 1/1993 | von Bonin . |
| 5,196,070 | 3/1993 | Ables et al. . |
| 5,356,568 | 10/1994 | Levine . |
| 5,387,655 | 2/1995 | Aslin . |
| 5,430,081 | 7/1995 | Ohmae et al. . |
| 5,498,466 | 3/1996 | Navarro et al. . |
| 5,596,029 | 1/1997 | Goebelbecker et al. . |
| 5,739,173 | 4/1998 | Lutter et al. . |
| 5,864,003 | 1/1999 | Qureshi et al. ............ 528/141 |
| 5,962,603 | 10/1999 | Qureshi et al. ............ 525/519 |

FOREIGN PATENT DOCUMENTS

| | | |
|---|---|---|
| 41 35 678 A1 | 5/1993 | (DE) . |
| 0 482 507 A2 | 4/1992 | (EP) . |
| 614944 | 9/1994 | (EP) . |
| 2 012 296 | 7/1979 | (GB) . |
| 1601884 | 11/1981 | (GB) . |
| 1604657 | 12/1981 | (GB) . |
| 2 151 237 | 7/1985 | (GB) . |
| WO 88/02019 | 3/1988 | (WO) . |
| WO 91/11498 | 8/1991 | (WO) . |
| WO 91/16402 | 10/1991 | (WO) . |

Primary Examiner—Kriellion Sanders
(74) Attorney, Agent, or Firm—Banner & Witcoff, Ltd.

(57) ABSTRACT

An aqueous composition containing a hardenable binder of a melamine compound, such as an acid-hardenable melamine-formaldehyde resin, and an acidic phosphorus compound, such as a nitrogen-containing phosphorus compound made from either phosphoric acid or phosphorus acid, and expandable graphite flake, which composition is curable to an intumescent composition.

18 Claims, No Drawings

INTUMESCENT COMPOSITION AND METHOD

BACKGROUND OF THE INVENTION

1. Field of the Invention

This invention broadly relates to a composition useful for imparting fire resistance to a variety of substrates, particularly for materials used in the building and construction industry. More particularly, this invention provides an aqueous composition containing as essential components a binder of a melamine compound and an acidic phosphorus compound, and expandable graphite flakes. After hardening the aqueous composition, it acts as an intumescent and imparts fire resistance to substrates treated with the composition.

2. Description of Related Art

Intumescent coatings are commonly applied to the surface of construction materials. Such coatings serve, for example, to prevent the spread of fire. Intumescent coatings are also applied to the surface of other flammable substrates, to reduce their flammability. U.S. Pat. No. 4,198,328 for example, describes an intumescent paint which includes a source of phosphoric acid, a carbon source and an expanding agent. These components are bound together by a conventional polymeric binder. Binders have included acrylic styrene or vinyl toluene copolymer, a styrene or vinyl toluene-butadiene-copolymer, a styrene or vinyl toluene-acrylonitrile-copolymer, polyurethane resins, alkyl resins and the like. Alternatively, polyvinyl alcohol, polyvinyl acetate, polyvinyl butyral, urea or melamine-formaldehyde resins and vinyl chloride-vinylidene chloride copolymers have been used. The use of epoxy resins in combination with various amino-functional curing agents also is known. In all of these formulations chlorinated paraffins or optionally chlorinated phosphate esters may be employed as plasticizers.

Other intumescent systems are also known. GB-A-2,151,237 discloses water-insoluble formulations which contain chlorinated polymers, novolak resin and chlorinated or phosphorylated plasticizers. GB-A-2,012,296 describes a three-layer intumescent paint which uses as the intermediate layer formulations which contain expandable graphite, hydrated alumina and binder systems based on halogenated elastomers and alkyl phenol-formaldehyde resins. The binder, in concert with a silicate top coating, functions to prevent the expanded graphite from crumbling and cracking. GB-A-1,604,908 mentions products with vermiculite and inorganic fibers as filler as well as elastomeric binders and clay.

Intumescent, fire resistant compositions act by forming an expanded, insulating layer of a hardly flammable material under the action of heat. The expanded layer shields the substrate from oxygen and/or from overheating and thereby prevents or delays the spread of flame, and prevents or at least delays reductions in the mechanical and static properties of structural supporting elements caused by heat.

A greater expansion (intumescence) produces thicker protective layers, but at the same time the thicker layers, generally due to their reduced mechanical stability, often are more easily detached from the substrate thus becoming less effective.

Conventional intumescent systems consist of a binder of the above type including urea-formaldehyde resins and melamine-formaldehyde resins, a char or carbon skeleton forming substance (typically referred to as "carbonific"), an expanding agent (typically referred to as "spumific") and an acid forming substance as essential components. As carbonifics, organic polyhydroxy compounds such as pentaerythritol, dipentaerythritol, tripentaerythritol, starch and sugars have been employed. Examples of spumifics are nitrogen-containing compounds such as melamine, melamine salts, melamine derivatives, urea, dicyandiamide and guanidine. The spumific effects the formation of a foamed (intumescent) layer by emission of an inert gas. As acid forming substances usually an aminophosphate, mainly ammonium phosphates and amine phosphates, preferably ammonium polyphosphate, and melamine phosphate, have found use. Examples of further additives are inorganic fibers which are to increase the mechanical strength of the intumescent layer and/or to prevent the dripping thereof, and metal oxides which act as smoke suppressants. Typical examples of such compositions can be found in U.S. Pat. Nos. 4,442,157, 4,638,538, 3,562,197, and GB-A-755,551.

Upon exposure to a flame, an intumescent composition swells up with the formation of a foam which repels the action of the fire. Many intumescence compositions, used, for example, as fire-preventive coatings or fire-preventive cements, on exposure to a flame form carbonization foams, because they contain, as intumescence media, carbohydrates or phenolic, polyurethane or melamine resins in combination with a phosphoric acid donor. Inorganic materials, for example alkali metal silicates containing water, can also foam up on exposure to a flame, and also are employed for the purposes of fire prevention. However, since these silicates are sensitive to air, moisture and/or $CO_2$, they can only be used to a limited extent as intumescence media.

In most organic-compound based intumescence compositions, carbonisable compounds in combination with phosphorus compounds act as the intumescence media. The carbonization foams formed on exposure to a flame have, however, only a low mechanical strength, put up only a low resistance to flame erosion and are degradable by oxidation. Organic fire-preventive materials of this type can also contain aluminum hydroxide, the function of which is to assist the foaming up of the carbonization melt by splitting off water under the influence of heat, and to carry off heat.

The carbonization of organic melts is promoted by phosphorus compounds which liberate phosphoric acid. As noted above, ammonium phosphates are therefore frequently employed as phosphoric acid donors, but their good solubility in water has often been considered a disadvantage.

There is, therefore, still a need for intumescence compositions which are not degradable by oxidation, which are insensitive towards air, moisture and $CO_2$, which upon exposure to a flame become effective even at temperatures below 200° C., and which form as far as possible an intumescent foam having mechanical stability.

Accordingly it is an object of the present invention to provide a composition having integrated intumescent properties which avoids or at least alleviates disadvantages of conventional prior art intumescent systems described above.

Compliance with various fire resistance testing methods is an important consideration in developing fire resistant compositions because many regulatory agencies and building codes rely on these tests in determining the acceptance of building materials used in various applications. Insurance rates may also be affected by compliance with fire resistance testing methods. In the present invention, fire resistance of the composition was determined in part using the Cone Calorimetric Test (ASTM E1354), the Tunnel Test (ASTM E-84), the Heat Release Test (ASTM E-906) and the Smoke Test (ASTM E-662).

BRIEF DESCRIPTION OF THE INVENTION

In a first aspect, the present invention is directed to an intumescent composition comprising the hardened product of an aqueous composition containing as essential components a binder of a melamine compound and an acidic phosphorus compound, and expandable graphite flakes.

The invention also relates to an aqueous composition suitable for imparting fire resistance to a substrate, such as by coating or impregnating the substrate with a nascent intumescent composition, said aqueous composition comprising as essential components a binder of a melamine compound and an acidic phosphorous compound, and expandable graphite flakes.

In accordance with yet another aspect of the invention, a substrate is rendered fire resistant by treating said substrate with an aqueous composition comprising as essential components a binder of a melamine compound and an acidic phosphorus compound, and expandable graphite flakes. The resultant fire resistant article, comprises the substrate coated or impregnated with the hardened composition containing a binder of a melamine compound and an acidic phosphorus compound, and expandable graphite flakes.

DETAILED DESCRIPTION OF THE INVENTION

In accordance with the present invention, an intumescent composition is prepared by hardening an aqueous composition containing a binder of a melamine compound and an acidic phosphorus compound, and expandable graphite flakes. The binder constitutes a char-forming, phosphorus-containing intumescent which serves to hold the expanded graphite flakes in contact with a substrate under conditions of thermal stress such that the intumescent coating is maintained as a barrier against the spread of fire.

The present invention is based on this interaction between the expanding graphite flakes, which form "worm like" structures on exposure to heat, and the intumescent char formed from the intumescent binder of the acidic phosphorus compound and the melamine compound. The intumescent char formed from the binder, binds the expanded graphite to the substrate so as to create a composite structure having the mechanical and insulative performance critical to the success of a fire retardant system.

The melamine compound of the binder component of the composition can comprise melamine per se, a modified melamine or a melamine-formaldehyde resin. Suitable modified melamines include methylated melamines.

Melamine-formaldehyde (MF) resins can be used as the melamine compound and are generally preferred. MF resins suitable for preparing the intumescent composition of the present invention are well known to those skilled in the art. Such resins can be prepared using known techniques by reacting melamine and formaldehyde in an aqueous reaction medium at a melamine to formaldehyde mole ratio in the range of 1:1 to 1:6. Preferably, the melamine:formaldehyde mole ratio is in the range of 1:2 to 1:4. In the broad practice of the present invention, standard reaction conditions, procedures and reactants widely used for preparing aqueous melamine-formaldehyde resins that can be cured to an infusible state with an acid catalyst, can be used.

An MF resin is generally prepared by adding melamine to an aqueous formaldehyde solution. Normally, the reaction is conducted, at least initially, at an alkaline pH, a pH normally of 7 to 10 typically being satisfactory, and at a temperature in the range of 50°–100° C., more usually at 60°–90° C. A variety of techniques are known in the art for reacting melamine and formaldehyde in the presence of an alkaline catalyst. Oftentimes, the resin is reacted in stages with separate partial additions of either one or both of the reactants and the alkaline catalyst. In the broad practice of the present invention, however, any process for producing an acid-curable MF resin can be advantageously employed.

Formaldehyde useful for preparing the resin generally is supplied as an aqueous solution known in the art as "formalin". Formalin is an aqueous solution that typically contains from about 37% to about 50% by weight formaldehyde. Other forms of formaldehyde such as paraformaldehyde also can be used. Other aldehydes, which may be used in combination with formaldehyde to introduce specific properties into the MF resin, include aliphatic aldehydes such as acetaldehyde and propionaldehyde; aromatic aldehydes such as benzylaldehyde and furfural and other aldehydes such as aldol, glyoxal and crotonaldehyde, also can be used. Similarly, a portion of the melamine for the melamine compound component could be replaced by other aminotriazines such as dicyandiamine and benzoguanamine.

Suitable melamine-formaldehyde resins also include methylated melamine resins and resins which have been modified with aromatic glycidyl ethers and/or cycloaliphatic epoxides. Specific examples of modifiers of said type are 3,4-epoxycyclohexyl-methyl-3,4-epoxycyclohexanecarboxylate and bisphenol-A-diglycidylether. These modifications may increase the strength of the cured composition and in the event of fire may result in an increased adhesion of the intumescent layer to the protected substrate. Preferably, the modifiers mentioned above are used in an amount such that they account for no more than about 1 to 15% by weight of the MF resin.

Sodium hydroxide generally is the alkaline catalyst of choice for synthesizing such melamine-formaldehyde resins. A non-limiting list of other potential alkaline catalysts includes, inter alia, other alkali metal hydroxides such as potassium hydroxide, alkali metal carbonates such as sodium and potassium carbonates, and alkaline earth metal oxides and hydroxides such as barium hydroxide, calcium hydroxide and calcium oxide. Organic amines also can be used in the broad practice of the invention.

Acid-curable melamine-formaldehyde resins useful in practicing the present invention, including water soluble MF resin powders, normally made by neutralizing and then spray-drying an aqueous MF resin solution, are items of commerce. Suitable commercial aqueous MF resin solutions and powdered MF resins for practicing the present invention are available, for example, from Cytec, BTL and Hoechst Celanese companies.

In the broad practice of the present invention, it also is possible to blend other acid-curable resins with the acid-curable melamine-formaldehyde resin component to provide certain property modifications to the base MF resin. For example, minor amounts of phenol-formaldehyde resins and urea-formaldehyde resins can be included in the aqueous compositions as modifiers. Normally, the total amount of such resin additives will be 50% or less, normally 30% or less, and most often 20% or less of the solids content of the aqueous composition.

The other essential constituent of the binder component of the composition of the present invention is the acidic phosphorus compound. Suitable acidic phosphorus compounds include the known phosphoric acid esters of polyhydroxy compounds (partial phosphate esters), as described in U.S. Pat. No. 5,387,655 (the disclosure of which is incorporated by reference), and certain nitrogen-containing, acidic phosphorus compounds.

The phosphoric acid esters can be prepared by reacting a polyol or a mixture of polyols, such as pentaerythritol, glycerol, trimethylol propane and the like, with a polyphosphoric acid. The reaction is conducted to a constant acid value, upon the controlled addition of the phosphoric acid to the polyol(s) under a reduced pressure, with vigorous agitation and with control of the temperature (e.g., 100° to 150° C.).

Suitable nitrogen-containing acidic phosphorus compounds contain one or more moieties of the following formula:

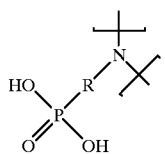

where R is selected from a $C_1$ to $C_6$ alkylene radical, a $C_3$ to $C_7$ cycloalkylene radical, an arylene radical and a divalent radical of the formula:

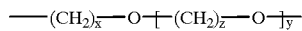

where x and z are integers of 1 to 6, and y is an integer from 0 to 2 and wherein the divalent radical is bonded to the phosphorus atom of said moieties through the terminal oxygen atom.

One preferred class of such nitrogen-containing acidic phosphorus compounds includes compounds of the following formula:

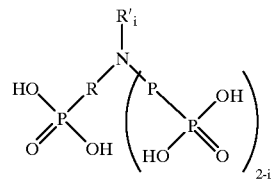

where R is selected from a $C_1$ to $C_6$ alkylene radical, a $C_3$ to $C_7$ cycloalkylene radical, an arylene radical and a divalent radical of the formula:

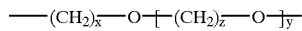

where x and z are integers of 1 to 6, and y is an integer from 0 to 2 and wherein the divalent radical is bonded to the phosphorus atoms of said compound through the terminal oxygen atom of said radical and where i is 0 or 1, and R' is selected from hydrogen, a $C_1$ to $C_6$ alkyl, a $C_1$ to $C_6$ alkoxy, a cycloalkyl and an aryl.

Another class of nitrogen-containing, acidic phosphorus compounds includes compounds of the formula:

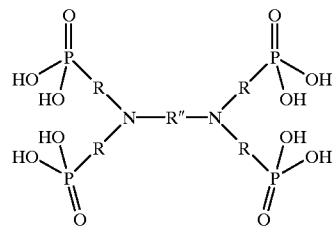

where R" is a divalent organic radical, such as an alkylene group having from 1 to 12 carbon atoms and R has the same meaning noted above.

Yet another class of nitrogen-containing, acidic phosphorus compounds has the formula:

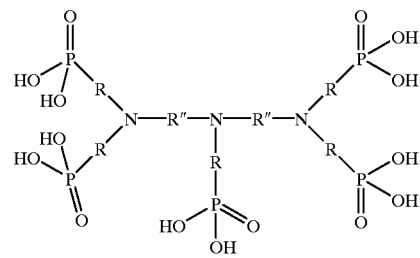

where R and R" have the same meanings as above.

One class of such compounds can be prepared by reacting (partially neutralizing) orthophosphoric acid ($H_3PO_4$) with an alkanol amine, and particularly a di- or tri-alkanol amine. Suitable alkanol amines may have the formula:

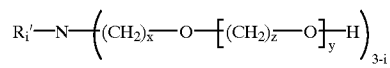

where i is either 0 or 1, R' is selected from hydrogen, a $C_1$ to $C_6$ alkyl, $C_1$ to $C_6$ alkoxy, a cycloalkyl, and an aryl, x and z are integers of 1 to 6, y is an integer from 0 to 2.

Phosphoric acid equivalents such as pyrophosphoric acid (which is equivalent to 105% orthophosphoric acid), tetraphosphoric acid (which is equivalent to 115% orthophosphoric acid) or phosphorus pentoxide (which is equivalent to 138% orthophosphoric acid) also may be used as the phosphoric acid source.

Such alkanol amines are c omm ercially available and include dimethanolamine, diethanolamine, dipropanolamine, dibutanolamine, trimethanolamine, triethanolamine, tripropanolamine, tributanolamine and the alkylene oxide adducts of these alkanolamines such as their ethylene oxide and propylene oxide adducts.

Acidic phosphorus compounds prepared in this manner from trialkanol amines and their adducts have the following formula:

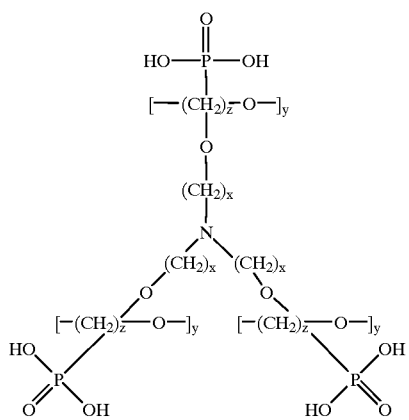

where the oxygen of the alkylenoxy is bonded to the phosphorus and where x, y and z have the same meaning defined above.

A particularly preferred nitrogen-containing, acidic phosphorus compound is the one prepared by neutralizing orthophosphoric acid with trimethanolamine, triethanolamine, tripropanolamine and the like. These preferred compounds have the formula:

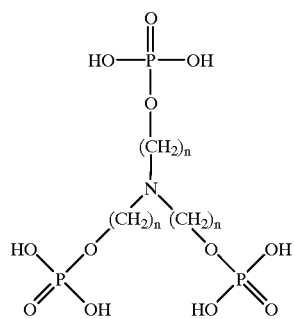

where n is an integer of 1 to 4.

The neutralization adduct of triethanolamine (TEA) and phosphoric acid in an amount of three moles of acid per mole of TEA is known in the art and is commercially available as aminotriethanol phosphate or ATP. For example, ATP is available commercially from P. Chem, Inc., Latexo, Tex. The reaction product is basically considered a triester of TEA and has an acid number of 510–525. ATP has the following formula:

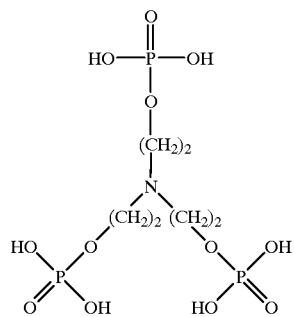

A second class of nitrogen-containing acidic phosphorus compounds useful in the practice of the present invention, generally referred to as phosphonates, can be prepared by reacting phosphorous acid, formaldehyde and ammonia or a primary or secondary amine through a phosphonomethylation reaction among the ammonia or amine, formaldehyde and phosphorous acid. Hydrochloric acid may be added to the reaction mixture to suppress the oxidation of phosphite to phosphate.

A diphosphonic acid of the formula:

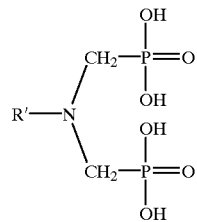

were R' is a monovalent organic radical, preferably a substituted or unsubstituted alkyl group having 1 to 6 carbon atoms such as propyl, isopropyl, butyl, hexyl or 2-hydroxyethyl, can be prepared from a primary amine. An example of a triphosphonic acid is aminotris(methylene-phosphonic acid) (ATMP) made by reacting ammonia, formaldehyde and phosphorous acid. ATMP has the formula:

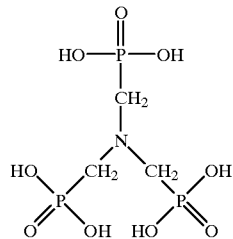

ATMP also is commercially available from P Chem, Inc. Examples of tetraphosphonic acids $R(PO_3H_2)_4$ are the alkylenediaminetetra(methylene-phosphonic acids) of the formula:

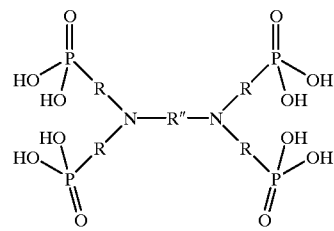

where R" is a divalent organic radical, such as an alkylene group having from 1 to 12 carbon atoms. One example is ethylenediaminetetra(methylene phosphonic acid). Examples of pentaphosphonic acids, $R(PO_3H_2)_5$ are the dialkylenetriaminepenta(methylene phosphonic acids) of the formula:

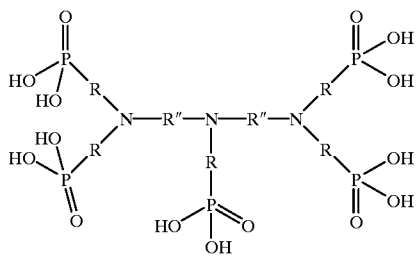

For example, such pentaphosphonic acids include diethylenetriaminepenta(methylene phosphonic acid) of the formula:

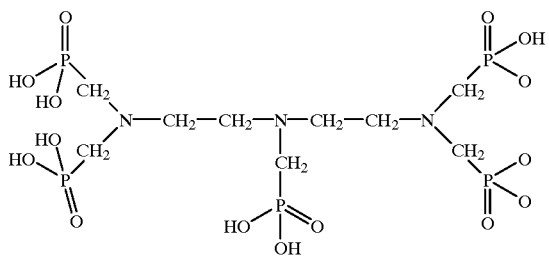

and bis hexamethylenetriaminepenta(methylene phosphonic acid) of the formula:

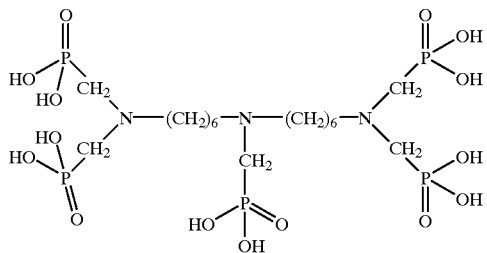

These nitrogen-containing acidic phosphorus compounds also are commercially available from P Chem as IS-32 and IS-22 respectively.

The acidic phosphorus compounds of the present invention are blended with the melamine compound, preferably a melamine-formaldehyde resin, to form the binder component of the subject composition. Relative proportions of the melamine compound and the acidic phosphorus compound are supplied sufficient to cause the binder to form a hardened coating at a desired rate and at a desired temperature. Normally, the acidic phosphorus compound will be added in an amount of 20 to 100 weight percent based on the weight of the melamine compound, preferably from 30 to 70 weight percent. To facilitate uniform blending of the melamine compound and the acidic phosphorus compound, the acidic phosphorus compound often is added to an aqueous solution of the melamine compound itself as a dilute aqueous solution containing between about 1 to 30% by weight of the acidic phosphorus compound. The solution may also contain additional solvents such as ethylene glycol and n-butanol. Generally, the acidic phosphorus compound is added in an amount to yield a phosphorus content in the ultimately hardened composition of at least about 5% by weight of the coating or impregnating composition, and particularly at least about 10% by weight. Normally, the phosphorus content of the hardened coating will not exceed about 30% by weight.

In one embodiment, an intumescent base composition can be prepared by dissolving melamine in an amount of 10 to 60% by weight of the final composition, preferably 20 to 50%, into a phosphoric acid ester of polyhydroxy compound at an elevated temperature of 100° to 200° C., more usually 120° to 170° C.

The final essential component of the compositions of the present invention is an expandable or swellable graphite flake, for example a graphite compound which contains expansive molecules in the interstitial lattice planes such as an acid, water, halogen, $NO_x$ and/or $SO_x$ and which expand, on heating to a temperature of approximately 150° to 600° C., to multiple times their initial volume (often two orders of magnitude). Mixtures of different types of expandable graphites flakes can also be used. A particularly useful intumescent additive in this regard is GRAFGuard™ expandable graphite flake commercially available from UCAR Carbon Co., Inc.

Graphite is a crystalline form of carbon comprising atoms bonded in flat layered planes with weaker bonds between the planes. By treating particles of graphite, such as natural graphite flake, with an intercalcant of e.g., a solution of sulfuric and nitric acid, the crystal structure of the graphite reacts to form a compound of graphite and the intercalcant. The treated intercalated particles of graphite are known as particles or flakes of "heat expandable graphite" and are commercially available. Upon exposure to high temperature, the particles or flakes of intercalated graphite undergo intumescence and expand in dimension as much as 80 or more times its original volume in an accordion-like fashion in a direction perpendicular to the crystalline planes of the graphite. The exfoliated, i.e. expanded, graphite particles are vermiform in appearance, and are therefore commonly referred to as worms.

A common method for making expandable graphite particles or flakes is described by Shane et al in U.S. Pat. No. 3,404,061 the disclosure of which is incorporated herein by reference. In the typical practice of this method, natural graphite flakes are intercalated by dispersing the flakes in a solution containing an oxidizing agent e.g., a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

A preferred intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated, excess solution is drained from the flakes and after washing with water, the intercalated graphite flakes are dried and are expandable upon exposure to a flame for only a few seconds. A preferred commercially available expandable graphite flake product is available from UCAR Carbon Company Inc under the tradename GRAFGuard™. This material has a relatively low "onset"

intumescent temperature which means that it will commence exfoliation generally after only a few seconds exposure to an elevated temperature.

Expansion of expandable graphite is known to have properties which decrease thermal conductivity and provide flame retardation (U.S. Pat. No. 5,176,863 and U.S. Pat. No. 3,574,644).

The expandable graphite flake is added to the binder in an amount sufficient to provide from about 5 to 50 grams of graphite per square foot of area to be treated with the intumescent composition. Generally providing a composition containing the graphite flake in an amount of from 10 to 60 percent by weight should be suitable.

It also may be advantageous under certain circumstances to incorporate additional intumescent adjuvants in the composition, e.g., in order to increase the rising rate of the intumescent layer further or to decrease the density thereof Such intumescent material additives are optionally employed in an amount of up to 200 percent by weight of the graphite flake. Such materials may include polyalcohols, swellable micas, silicates, borates and/or synthetic borosilicates. Such components are usually present in the composition in a minor amount of up to 15% to 30% by weight of the binder solids.

If appropriate, additional binders and the usual fillers can also be used in connection with the present invention. As noted above, such binders may include other resinous compositions such as phenol-formaldehyde (PF) and urea-formaldehyde (UF) resins. Examples of fillers which can be used are chalk, asbestos, metal powders, metal oxides, metal hydroxides, silicates, carbon, powdered rock, mineral fibers, glass, slags, filter dusts and ashes. The fillers optionally can be added in quantities of, for example, 0 to 30% by weight, preferably 0 to 10% by weight (relative to the binder solids).

Conventional pigments may also be added to the compositions according to the present invention, the total amount thereof usually not exceeding 5 to 50%, particularly 10 to 40% by weight of the total weight of the binder solids. As pigments, all substances which are employed in conventional intumescent compositions and which preferably are of mineral (inorganic) nature are suitable. Examples of such pigments are titania and carbon black.

The aqueous composition of the present invention has particular use as a composition for coating or impregnating a variety of substrates for imparting fire resistant characteristics. Thus, the compositions according to the present invention are preferably present in a form suitable for coating and impregnation purposes, for example as an aqueous or water-containing solution or as a dispersion. The water content of the composition depends on the amount and the nature of the components employed, but preferably is not higher than about 80% by weight of the total composition including water. Normally, the total solids content of the aqueous composition is between about 20 and 90% by weight with compositions having a solids content above about 50% and more usually above 60%, depending on the intended application, generally being preferred. As used herein, the solids content of a composition is measured by the weight loss upon heating a small, 1–5 gram, sample of the composition at about 135° C. for about 2 hours.

Compositions according to the present invention are preferably employed for coating or impregnating articles made of wood (including plywood, OSB, LVL, waferboard, particleboard and the like), plastic (including plastic composites and plastic foams), cellulosic materials (including paper, containerboard, fiberboard and the like) rubber, gypsum board, metal, woven and non-woven glass and ceramic material. The application of the composition may be carried out according to any conventional method, e.g. by spraying, dipping, drawing and brushing. The coating or impregnating process may optionally be repeated several times. The coating thickness and impregnation amount may vary within a wide range, depending on the viscosity of the composition and the substrate to be coated or impregnated. Conventional coating thicknesses range from 0.010 mm to 3 mm.

A particularly preferred application for compositions of the present invention are for treating fiber reinforced plastic (FRP) composites, particularly FRP composites designed for the interior of aircrafts. Such composites typically are based on the use of thermoset resins (e.g., epoxy resins, phenolic resins and the like) and employ a variety of reinforcing fibers (e.g., glass, carbon, Kevlar®) and Nomex® honeycomb. Current FRP panels for the interior walls and ceilings are based on phenolic FRP's because they meet OSU heat release requirements (<65/65) and smoke requirements (<20 @ 4 minutes), per FAA guidelines. FRP panels used in floors are generally based on epoxy resins due to their excellent adhesion with Nomex® and current smoke specifications still allow for the use of epoxy resins (<200 @ 4 minutes). The present invention, as illustrated specifically in Examples 7–11, provides a way for improving the behavior of these epoxy panels, relative to the smoke specifications, to a level similar to the current properties for phenolic FRP's.

The hardening of the composition (e.g., as a coating) is preferably carried out at room temperature, although said hardening can also be carried out at an elevated temperature, often a slightly elevated temperature (preferably up to about 60° C.) will be sufficient, depending on the nature of the components employed.

EXAMPLES

In order to facilitate a more complete understanding of the invention, a number of Examples are provided below. However, the scope of the invention is not limited to specific embodiments disclosed in these Examples, which are for purposes of illustration only. All proportions and quantities referred to in the following examples are by weight unless otherwise stated.

In some of the following examples, the usefulness of various compositions as an intumescent coating was evaluated using the Cone Calorimeter test (ASTM E1354). In this test, heat is applied using a heat flux of a specified intensity generated by a conical radiant heater directed onto an insulated 4 inch by 4 inch test specimen. The parameters which can be monitored include (1) the time to initial ignition of the sample, (2) the heat release rate, (3) the total heat released, (4) the effective heat of combustion and (5) the weight loss of the sample. In the actual tests reported below, the respective compositions were coated onto specimens of plywood board or oriented strand board (OSB). An uncoated plywood specimen exhibited a time to ignition ($T_{ig}$) of approximately 44 seconds.

In testing the compositions of Comparative Example 8 and Example 8, a modified version of the cone calorimeter test was conducted as follows: a flat, spiral heating element was used to irradiate a sample surface. During the test, samples measuring 4 inch by 4 inch by 1 inch were placed so that the sample surface was 48 mm from the surface of the heating element. Unless otherwise indicated, each sample was heated for 90 seconds. The time to ignition (Tig) and the mass loss were monitored. Unless otherwise indicated, samples that were burning at the conclusion of the heating were removed from the test apparatus and were promptly extinguished in order to calculate the mass loss during the test.

Comparative Example 1

A commercial liquid melamine-formaldehyde/phenol formaldehyde resin marketed by Burke-Hall Coatings (BHC) was mixed with an equal amount of a commercial phosphate ester, Budit-380, commercially available from Chemische Fabrik Budenheim and believed to be a partial ester of a polyol (e.g. pentaerthrytol) and phosphoric acid as disclosed in U.S. Pat. No. 5,387,655. The composition contained at least 10% phosphorus by weight. The mixture then was coated on a 4 inch by 4 inch square of OSB to provide a coating weight of 2 grams (18 grams/ft$^2$).

Example 1

A commercial liquid melamine-formaldehyde/phenol-formaldehyde resin marketed by Burke-Hall Coatings (BHC) was mixed with an equal amount of the commercial phosphate ester, Budit-380 commercially available from Chemische Fabrik Budenheim, and with an equal amount of GRAFGuard™ expandable graphite flake marketed commercially by UCAR Carbon Company, Inc. The composition contained about 8% phosphorus by weight. The mixture then was coated on a 4 inch by 4 inch square of OSB to provide a coating weight of 3 grams (27 grams/ft$^2$).

Comparative Example 2

A commercial liquid melamine-formaldehyde/phenol-formaldehyde resin marketed by Burke-Hall Coatings (BHC) was mixed with an equal amount aminotriethanol-phosphate acidic phosphorus curing agent (ATP). The composition contained about 6% phosphorus by weight. The mixture then was coated on a 4 inch by 4 inch square of OSB to provide a coating weight of 2 grams (18 grams/ft$^2$).

Example 2

A commercial liquid melamine-formaldehyde/phenol-formaldehyde resin marketed by Burke-Hall Coatings (BHC) was mixed with an equal amount aminotriethanol-phosphate acidic phosphorus curing agent (ATP) and with an equal amount of GRAFGuard™ expandable graphite flake marketed commercially by UCAR Carbon Company, Inc. The composition contained about 5% phosphorus by weight. The mixture then was coated on a 4 inch by 4 inch square of OSB to provide a coating weight of 3 grams.

Cone Calorimeter Tests (CCT)

The OSB specimens coated with the compositions of Comparative Examples 1 and 2 and Examples 1 and 2 were tested for their performance in the CCT. The composition test results are presented below in Table 1. Addition of GRAFGuard™ expandable graphite flake to the composition of Comparative Example 2 gave a 54 percent increase in Tig. The height of intumescent produced was 0.5 inches and the expanded flake appeared to be bonded by the intumescent material derived from the binder/coating system. This synergism is highly unexpected from the standpoint of coating durability and fire resistance enhancement.

TABLE 1

CONE CALORIMETER TEST RESULTS OBTAINED OVER A TEN MINUTE PERIOD

| Example | Ext. Ht. Flux, (kW/m$^2$) | $T_{ig}$, (sec) | Peak Heat Release Rate (kW/m$^2$) | Average Heat Release Rate (kW/m$^2$) | Initial Mass, (g) | Mass Loss, (g) | Mass Loss, (%) |
|---|---|---|---|---|---|---|---|
| Comp. Ex. 1 | 35 | 203 | 67 | 44 | 87.5 | 27.6 | 32 |
| Ex. 1 | 35 | 443 | 37 | 17 | 88.9 | 12.4 | 14 |
| Comp. Ex. 2 | 35 | 644 | <10 | 4 | 82.9 | 9.1 | 11 |
| Ex. 2 | 35 | 990 | <10 | 3 | 88.8 | 5.3 | 6 |

ABBREVIATIONS:
$T_{ig}$ Time to ignition
HRR Heat Release Rate
THR Total Heat Released
Eff. Hc Effective Heat of Combustion

Comparative Example 3

A commercial powdered (spray-dried) melamine-formaldehyde resin marketed by Cytec as Aerotru-19 (34.7 wt. %) was mixed with water (10.5 wt. %), n-butanol (2.4 wt. %), a commercial liquid acid curable PF resin from Georgia-Pacific Resins, Inc. (GP637D52) (2.4 wt. %) and aminotriethanolphosphate acidic phosphorus curing agent (ATP) (50 wt. %). The composition contained about 8% phosphorus by weight. The mixture then was applied as a coating in an amount of about 27 grams of aqueous coating per square foot on 4 ft.×8 ft. panels of OSB and fiberboard. The coated products were tested (E-84 Tunnel Test). The test results are reported in Table 2.

Example 3

A commercial powdered (spray-dried) melamine-formaldehyde resin marketed by Cytec as Aerotru-19 (21.9 wt. %) was mixed with water (6.4 wt. %), n-butanol (1.5 wt. %), a commercial liquid acid curable PF resin (GP637D52) (1.5 wt. %), aminotriethanolamine acidic phosphorus curing agent (ATP) (29.5 wt. %) and GRAFGuard™ expandable graphite flake (30.3 wt. %). The composition contained about 6% phosphorus by weight. The mixture then was applied as a coating in an amount of about 27 grams of aqueous coating per square foot on 4 ft.×8 ft. panels of OSB and fiberboard. The coated products were tested (E-84 Tunnel Test). The test results are reported in Table 2.

TABLE 2

E-84 Tunnel Test Results for Coated OSB and Sound Deadening Fiberboard Panels

| Example | Panel | Flame Spread Index | Smoke Development |
|---|---|---|---|
| Comp. Ex. 3 | OSB | 10 | 100 |
| Ex. 3 | OSB | 5 | 20 |
| Comp. Ex. 3 | Fiberboard | 20 | 185 |
| Ex. 3 | Fiberboard | 10 | 40 |

Example 4

Using the compositions of Comparative Example 3 and Example 3, Underwriter Laboratories small scale fire tests (an alcohol flame impingement with 45° oriented sample) were conducted on hardboard. Table 3 illustrates the aqueous coating weight on the hardboard samples and the test results. An uncoated control board also was tested.

TABLE 3

Underwriter Laboratory Small Scale
Fire Test Results for Coated Hardboard

| Example | Uncured Coating Wt. (g/ft.$^2$) | Burn Area (square inches) | Burn Time (seconds) |
|---|---|---|---|
| Comp. Ex. 3 | 14 | 12.95 | 0 |
| Ex. 3 | 14 | 0 | 0 |
| Ex. 3 | 28 | 0 | 0 |
| Control (no coating) | — | 15.31 | 60 |

Comparative Example 5

An intumescent binder was prepared by initially preparing a pentaerythritol phosphate ester by mixing 30 parts by weight pentaerythritol with 10 parts by weight phosphoric acid (100%) and forming a melt. Thereafter, an additional 5 parts by weight of $P_2O_5$ was added to the melt. After heating for 5 minutes at 150° C. a clear melt is obtained. Finally, 30 parts by weight of melamine powder is added to the phosphate ester melt over 20 minutes with heating. The resulting mixture was applied as produced (100% solids by weight) in an amount of about 18 grams/ft$^2$ onto an OSB substrate (4"×4"×7/16") to provide an intumescent coating. The coated board was subjected to CCT at a radiant heat flux of 35 kW/m$^2$ for ten minutes. The results are presented in Table 4.

Example 5

An intumescent composition also was prepared by adding GRAFGuard™ expandable graphite flake to the binder of Comparative Example 5 and the composition was coated onto an OSB panel (4"×4"×7/16") at a loading of 9 g/ft$^2$ GRAFGuard™ expandable graphite flake and 18 g/ft$^2$ of the intumescent composition described in Comparative Example 5. This coated panel also was subjected to CCT at a radiant heat flux of 35 kW/m$^2$ for ten minutes. The results are presented in Table 4.

Comparative Example 6

An intumescent binder was prepared by mixing 25% by weight of the binder of Comparative Example 5, 25% by weight of a 30% solution of aminotriethanolphosphate and 50% by weight of the BHC resin mixture. The binder was coated onto an OSB panel (4"×4"×7/16") in an amount of 18 grams/ft$^2$ and subjected to CCT as above. The results are presented in Table 4.

Example 6

Using the binder composition of Comparative Example 6, a coating slurry was prepared by adding an amount of GRAFGuard™ expandable graphite flake equal in amount to the BHC resin in the original mixture. The composition was applied as a coating onto an OSB panel in an amount of 27 grams/ft$^2$ and subjected to CCT as above. The results are presented in Table 4.

TABLE 4

SUMMARY OF CONE CALORIMETER TEST RESULTS FOR A TEN MINUTE PERIOD

| Example No. | Time to Ignition (sec.) | Peak Heat Release Rate (kw/m$^2$) | Average Heat Release | Mass Loss (% @ 10 min.) |
|---|---|---|---|---|
| Plywood Control | 44 | 207 | 103 | 75 |
| Comp. Ex. 5 | 165 | 68 | 17 | 31 |
| Ex. 5 | >600 | 5 | <1 | 8 |
| Comp. Ex. 2 | 644 | <10 | 4 | 11 |
| Ex. 2 | 990 | <10 | 3 | 6 |
| Comp. Ex. 1 | 203 | 67 | 44 | 32 |
| Ex. 1 | 443 | 37 | 17 | 14 |
| Comp. Ex. 6 | 643 | — | 2 | 11 |
| Ex. 6 | 742 | — | 3 | 7 |

Data reported at end of 10 minute time period for Peak Heat Release, Average Heat Release and Mass Loss.

Comparative Example 7

A commercial liquid melamine-formaldehyde resin marketed by Georgia-Pacific Resins, Inc. GP-542D59 (50 parts) was mixed with an acidic phosphorus curing agent (ATP) (25 parts) and the binder of Comparative Example 5 (25 parts). The mixture then was coated on a 4 inch by 4 inch square of OSB to provide a coating weight of 2 grams (18 grams/ft$^2$). The results are presented in Table 5.

Example 7

Using the binder composition of Comparative Example 7, a coating slurry was prepared by adding an amount of GRAFGuard™ expandable graphite flake equal to the melamine-formaldehyde resin in the original mixture. The composition was applied as a coating onto an OSB panel in an amount of 3 grams (27 grams/ft$^2$) and subjected to CCT as above. The results are presented in Table 5.

TABLE 5

Summary of Cone Calorimeter Test Results Obtained Over a Ten Minute Period

| Example | Ext. Ht. Flux, kW/m$^2$ | Tig, s | Peak HRR, kW/m$^2$ | Time to Peak, s | Ave. HRR Ign. + 60s kW/m$^2$ | THR, kJ | Eff. Hc, MJ/kg | Ave. Spec. Extn. Area, m$^2$/kg | Initial Mass, g | Mass Loss, g | Mass* Loss, % |
|---|---|---|---|---|---|---|---|---|---|---|---|
| Comp. Ex. 7 | 35 | 337 | 64.5 | 452 | 17.55 | 119 | 6.2 | 60.0 | 84.1 | 19.4 | 23.1 |
| Ex. 7 | 35 | 425 | 31.4 | 585 | 19.73 | 51 | 4.3 | 5.4 | 88.9 | 12.0 | 13.5 |

ABBREVIATIONS:
Tig  Time to ignition
HRR  Heat Release Rate
THR  Total Heat Released
Eff. Hc  Effective Heat of Combustion

Comparative Example 8

An aqueous resin composition useful for producing an intumescent coating was prepared by mixing 66 grams of a commercial liquid melamine-formaldehyde/phenol-formaldehyde resin marketed by Burke-Hall Coatings (BHC) with 61 grams of deionized water and 66 grams of aminotriethanolphosphate acidic phosphorus curing agent (ATP) with stirring until a colorless, water-clear solution was obtained.

Example 8

An aqueous resin composition containing GRAFGuard™ expandable graphite flakes useful for producing an intumescent coating was prepared by taking 67 grams of the aqueous resin composition of Comparative Example 8 and adding 23 grams of expandable graphite.

Heat Resistance Testing

The intumescent behaviors of hardened coatings of the Comparative Example 8 and Example 8 compositions were examined by brushing the respective aqueous compositions onto 4-inch samples of foam, with the samples then placed in a 70° C. oven for seventy minutes to harden the coating. Two types of semi-rigid polyurethane foam were used to evaluate the effectiveness of hardened intumescent compositions of the aqueous resin compositions. Foam A comprised a polyurethane foam without any additional flame retardant additive, while Foam B comprised a polyurethane foam containing a halogenated flame retardant additive. The coating weights reported below exclude the amount of deionized water used in preparing the aqueous compositions.

An uncoated sample of Foam A (Control A), placed in the laboratory test apparatus and heated, began to burn vigorously after 3 seconds with the evolution of large amounts of black smoke. The sample continued burning when removed from the test fixture after 30 seconds, and was completely consumed after an additional 60 seconds. Mass loss was 100%.

An uncoated sample of Foam B (Control B) containing a halogenated flame retardant additive was placed in the test apparatus and heated for 90 seconds. The sample began to burn vigorously after 3 seconds with the evolution of large amounts of black smoke. The sample continued burning when removed from the test fixture after 90 seconds, and was completely consumed in an additional 30 seconds. Mass loss of the foam was 100%.

A sample of semi-rigid polyurethane Foam A was coated with 3.9 grams of the composition of Comparative Example 8 (35 grams/ft$^2$). The sample was oven-dried, then placed in the test apparatus and heated for 90 seconds. The sample began to burn vigorously after 7 seconds with the evolution of black smoke. The foam sample lost 85% of its original mass by the end of the test.

A sample of semi-rigid polyurethane Foam A was coated with 3.8 grams of the composition of Example 8 (34 grams/ft$^2$). The dried sample was placed in the test apparatus and heated for 90 seconds. The graphite began to expand within 20 seconds, insulating the surface of the foam. There was no sustained ignition and no black smoke generated during the test. The expanded layer containing the graphite worms showed good rigidity and adhesion to the foam by virtue of the co-expansion of the graphite with the intumescent resin. There was some decomposition of the foam under the intumescent layer. Foam mass loss was only 15%.

A sample of semi-rigid polyurethane Foam B was coated with 3.1 grams of the composition of Comparative Example 8 (28 grams/ft$^2$). The dried sample was placed in the test apparatus and heated for 90 seconds. The sample began to burn vigorously after 4 seconds with the evolution of extremely thick, black smoke. The foam sample loss 100% of its original mass by the end of the test.

A sample of semi-rigid polyurethane Foam B was coated with 4.5 grams of the composition of Example 8 (41 grams/ft$^2$). The dried sample was placed in the test apparatus and heated for 90 seconds. The graphite was fully expanded within 22 seconds, insulating the surface of the foam with about a 0.75-inch layer of expanded graphite worms and resin. The expanded layer containing the graphite worms showed good rigidity and adhesion to the foam by virtue of the co-expansion of the graphite with the intumescent resin. There was no ignition or "flashing" (momentary, unsustained ignition), and no black smoke generated during the test. There was some decomposition of the foam under the intumescent layer during the test. Foam mass loss was only 13%.

The results of the foregoing tests are summarized in Table 6.

TABLE 6

| FOAM TYPE | INTUMESCENT COATING | TIME TO IGNITION (Sec.) | FOAM MASS LOSS (%) | OBSERVED SMOKE |
| --- | --- | --- | --- | --- |
| A | NONE | 3 | 100 | HEAVY |
| A | COMP. EX. 8 | 7 | 85 | HEAVY |
| A | EXAMPLE 8 | >90 | 15 | NONE |
| B | NONE | 3 | 100 | HEAVY |
| B | COMP. EX. 8 | 4 | 100 | HEAVY |
| B | EXAMPLE 8 | >90 | 13 | NONE |

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

What is claimed is:

1. An intumescent composition comprising a hardened binder of a melamine compound and an acidic phosphorus compound, said binder containing expandable graphite flakes.

2. An aqueous composition suitable for producing a fire resistant coating on a substrate, said composition comprising a hardenable binder of a melamine compound and an acidic phosphorus compound, said binder containing expandable graphite flakes.

3. A method for imparting fire resistance to a substrate comprising treating said substrate with an aqueous composition comprising a hardenable binder of a melamine compound and an acidic phosphorus compound, said binder containing expandable graphite flakes.

4. A fire resistant article comprising a substrate coated or impregnated with a hardened aqueous composition, said composition comprising a hardenable binder of a melamine compound and an acidic phosphorus compound, said binder containing expandable graphite flakes.

5. The invention of claim 1, 2, 3 or 4 wherein the melamine compound is an acid curable melamine-formaldehyde resin.

6. The invention of claim 5 wherein the phosphorus compound contains one or more moieties of the following formula:

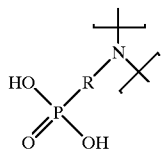

where R is selected from the group consisting of a $C_1$ to $C_6$ alkylene radical, a $C_3$ to $C_7$ cycloalkylene radical, an arylene radical and a divalent radical of the formula:

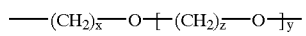

where x and z are integers of 1 to 6, and y is an integer from 0 to 2 and wherein the divalent radical is bonded to the phosphorous atom of said moieties through the terminal oxygen atom of said radical.

7. The invention of claim 1, 2 3 or 4 wherein the phosphorus compound is a compound of the following formula:

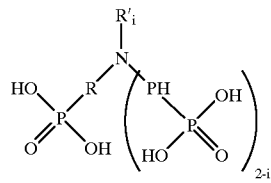

where R is selected from the group consisting of a $C_1$ to $C_6$ alkylene radical, a $C_3$ to $C_7$ cycloalkylene radical, an arylene radical and a divalent radical of the formula:

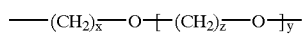

where x and z are integers of 1 to 6, and y is an integer from 0 to 2 and wherein the divalent radical is bonded to the phosphorous atoms of said compound through the terminal oxygen atom of said radical where i is 0 or 1, and R' is selected from hydrogen, a $C_1$ to $C_6$ alkyl, a $C_1$ to $C_6$ alkoxy, a cycloalkyl and an aryl.

8. The invention of claim 7 wherein the melamine compound is a melamine-formaldehyde resin prepared by reacting melamine and formaldehyde in an aqueous reaction medium under an alkaline condition at a melamine to formaldehyde mole ratio in the range of 1:1 to 6:1.

9. The invention of claim 8 wherein the phosphorus compound is selected from the group consisting of aminotriethanol phosphate and aminotris(methylene-phosphonic acid).

10. The invention of claim 1, 2 3 or 4 wherein the phosphorus compound is a compound of the following formula (II):

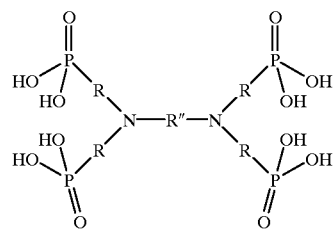

where R is selected from the group consisting of a $C_1$ to $C_6$ alkylene radical, a $C_3$ to $C_7$ cycloalkylene radical, an arylene radical and a divalent radical of the formula:

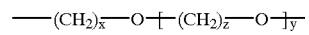

were x and z are integers of 1 to 6, and y is an integer from 0 to 2 and wherein the divalent radical is bonded to the phosphorous atoms of said compound through the terminal oxygen atom of said radical and where R" is a divalent organic radical.

11. The invention of claim 10 wherein the melamine compound is a melamine-formaldehyde resin prepared by reacting melamine and formaldehyde in an aqueous reaction medium under an alkaline condition at a melamine to formaldehyde mole ratio in the range of 1:1 to 1:6.

12. The invention of claim 11 wherein the phosphorus compound is ethylene diamine tetra(methylene phosphonic acid).

13. The invention of claim 1, 2 3 or 4 wherein the phosphorus compound is a compound of the following formula (III):

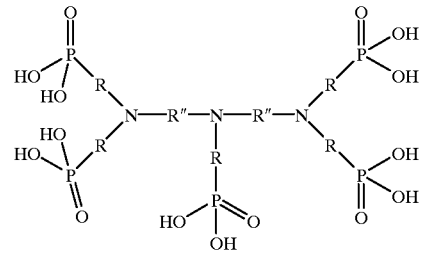

where R is selected from the group consisting of a $C_1$ to $C_6$ alkylene radical, a $C_3$ to $C_7$ cycloalkylene radical, an arylene radical and a divalent radical of the formula:

where x and z are integers of 1 to 6, and y is an integer from 0 to 2 and wherein the divalent radical is bonded to the phosphorous atoms of said compound through the terminal oxygen atom of said radical and where R" is a divalent organic radical.

14. The invention of claim 13 wherein the melamine compound is a melamine-formaldehyde resin prepared by reacting melamine and formaldehyde in an aqueous reaction medium under an alkaline condition at a melamine to formaldehyde mole ratio in the range of 1:1 to 1:6.

15. The invention of claim 14 wherein the phosphorus compound is selected from the group consisting of diethylenetriaminepenta(methylene phosphonic acid) and bis hexamethylenetriaminepenta(methylene phosphonic acid).

16. The invention of claim 1, 2 3 or 4 wherein the phosphorus compound is a partial phosphate esters of phosphoric acid and a polyhydroxy compound.

17. The invention of claim 16 wherein the melamine compound is a melamine-formaldehyde resin prepared by reacting melamine and formaldehyde in an aqueous reaction medium under an alkaline condition at a melamine to formaldehyde mole ratio in the range of 1:1 to 1:6.

18. The invention of claim 17 wherein the phosphorus compound is the reaction product of phosphoric acid and a polyhydroxy compound selected from the group consisting of pentaerythritol, glycerol, trimethylol propane and mixtures thereof.

* * * * *

UNITED STATES PATENT AND TRADEMARK OFFICE
CERTIFICATE OF CORRECTION

PATENT NO. : 6,228,914 B1
DATED : May 8, 2001
INVENTOR(S) : Brian M. Ford et al.

It is certified that error appears in the above-identified patent and that said Letters Patent is hereby corrected as shown below:

Title page,
Item [56], References Cited,
-- OTHER DOCUMENTS International Search Report for PCT/US98/27530 dated April 2, 1999 -- has been inserted.

Column 6,
Line 58, "c omm ercially" has been replaced with -- commercially --.

Column 19, claim 7,
Line 32, "PH" has been replaced with -- R --.

Signed and Sealed this

Twentieth Day of November, 2001

Attest:

*Attesting Officer*

NICHOLAS P. GODICI
*Acting Director of the United States Patent and Trademark Office*